(12) United States Patent
Clark

(10) Patent No.: US 9,205,792 B1
(45) Date of Patent: Dec. 8, 2015

(54) INFLATABLE BOLSTER IN A VEHICLE BUMPER

(71) Applicant: Ford Global Technologies, LLC, Dearborn, MI (US)

(72) Inventor: Todd N. Clark, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/529,791

(22) Filed: Oct. 31, 2014

(51) Int. Cl.
*B60R 19/00* (2006.01)
*B60R 19/20* (2006.01)
*B60R 21/0134* (2006.01)

(52) U.S. Cl.
CPC ........... *B60R 19/205* (2013.01); *B60R 21/0134* (2013.01)

(58) Field of Classification Search
CPC .......................... B60R 19/205; B60R 21/0134
USPC ....................................................... 296/107
See application file for complete search history.

(56) References Cited

U.S. PATENT DOCUMENTS

| | | | | |
|---|---|---|---|---|
| 4,815,777 A | * | 3/1989 | Campbell | 293/107 |
| 5,106,137 A | * | 4/1992 | Curtis | 293/107 |
| 6,497,183 B2 | * | 12/2002 | Demarquilly et al. | 105/392.5 |
| 7,201,412 B2 | | 4/2007 | Kashiwagi et al. | |
| RE42,364 E | * | 5/2011 | Hayakawa | 280/740 |
| 8,752,860 B2 | * | 6/2014 | Kim et al. | 280/728.2 |
| 2002/0005142 A1 | * | 1/2002 | Demarquilly et al. | 105/392.5 |
| 2003/0020289 A1 | * | 1/2003 | Dohrmann et al. | 293/107 |
| 2013/0119681 A1 | | 5/2013 | Mendis et al. | |

FOREIGN PATENT DOCUMENTS

| | | |
|---|---|---|
| DE | 19905784 A1 | 9/1999 |
| DE | 10020658 A1 | 10/2001 |
| EP | 1088707 A1 | 4/2001 |
| JP | 2004074971 A | 3/2004 |

OTHER PUBLICATIONS

Ziemba, Editor, WDD, New Airbag Protects Pedestrians, http://www.manufacturing.net/print/articles/2013/02/new-airbag-protects-pedestrians, Feb. 19, 2013 (2 pages).

* cited by examiner

*Primary Examiner* — Joseph D Pape
(74) *Attorney, Agent, or Firm* — Frank A. MacKenzie; Bejin Bieneman PLC

(57) ABSTRACT

An outer bumper and an inner bumper have disposed therebetween a plastic bolster. At least one inflator is communicatively coupled to a controller and arranged to inflate the plastic bolster. The bolster is formed of a plastic having sufficient rigidity to fold. In one example, the bolster includes accordion folds in an undeployed state.

20 Claims, 3 Drawing Sheets

INFLATABLE BOLSTER IN A VEHICLE BUMPER

BACKGROUND

Equipping vehicles to enhance pedestrian safety has been a subject of growing interest in recent years. Unfortunately, existing pedestrian protection systems require vehicles to include bulky and unwieldy energy absorbing materials at a front end of a vehicle to protect a pedestrian in the event of an impact. For example, energy absorbing materials that are presently used are typically closed or open cell foam, or injection or blow-molded plastic. Because present materials are static, they are required to be thick enough to absorb the impact of the pedestrian, therefore limiting the flexibility of the design of the vehicle's front fascia and overhang.

DRAWINGS

DESCRIPTION

Figure 1:
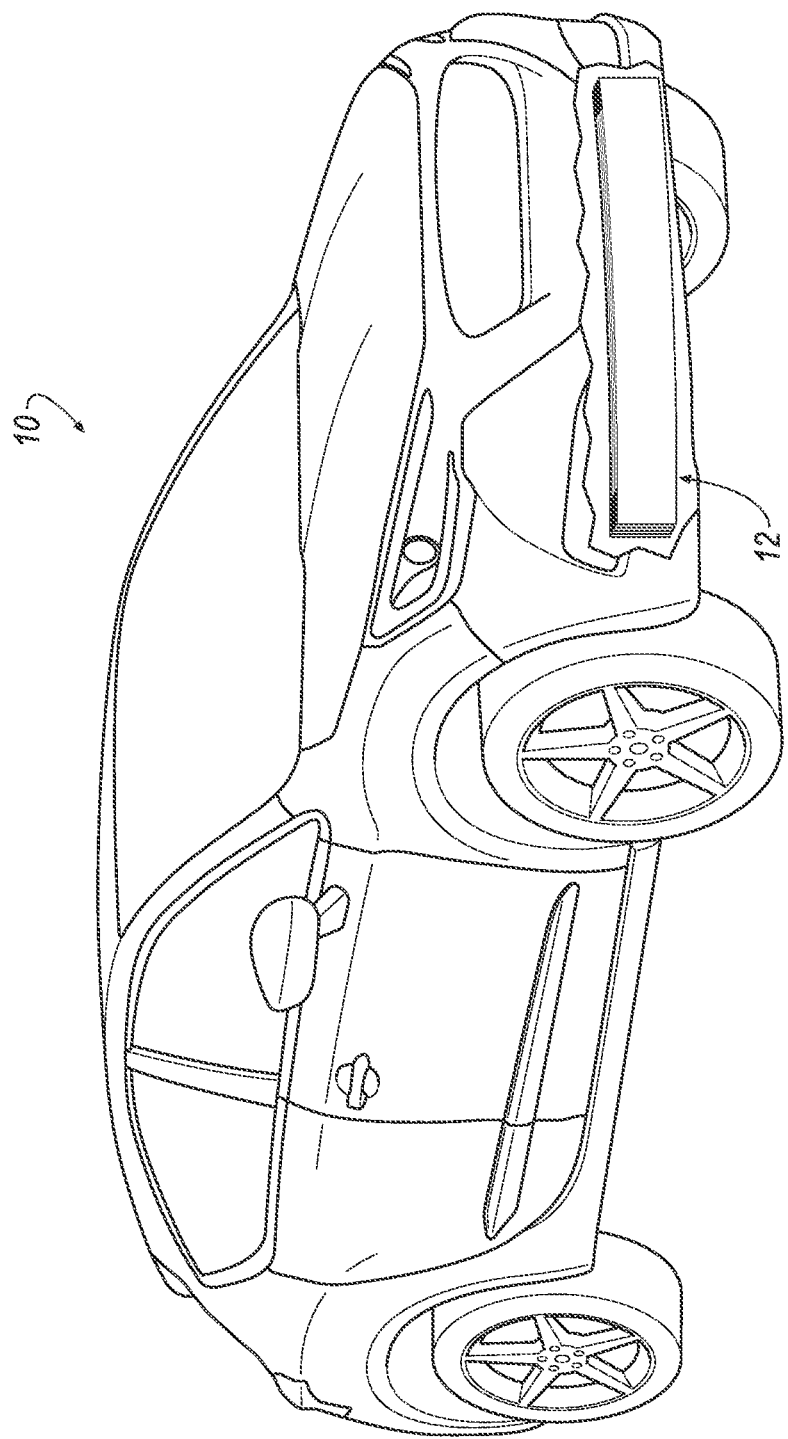
FIG. 1 is a perspective view of a vehicle including an exemplary bumper bolster system.
Figure 2:
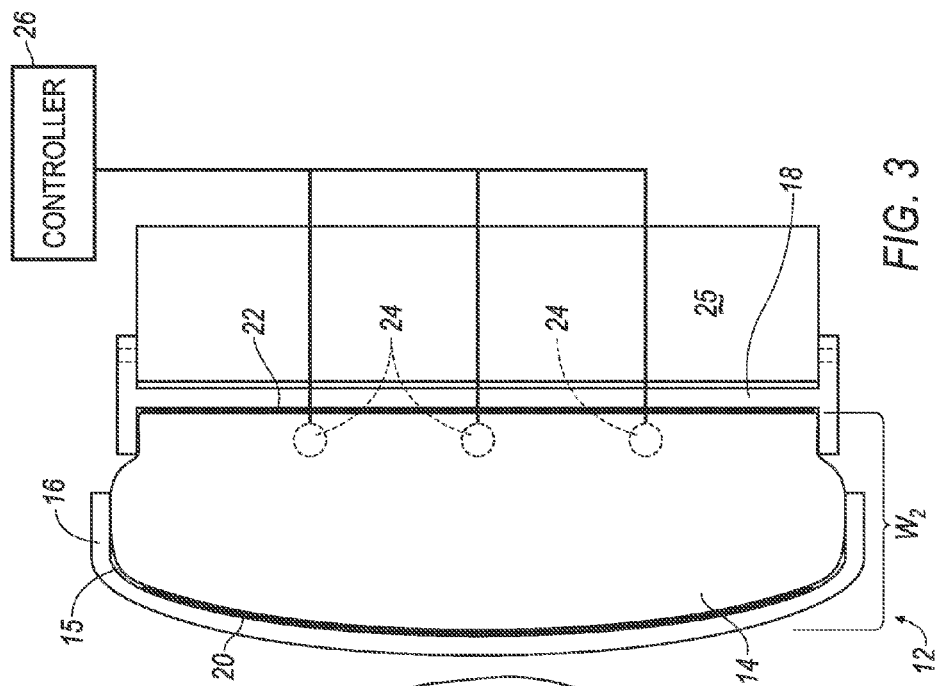
FIG. 2 is a top sectional view of an exemplary bumper bolster system with a bolster in an undeployed state.
Figure 3:
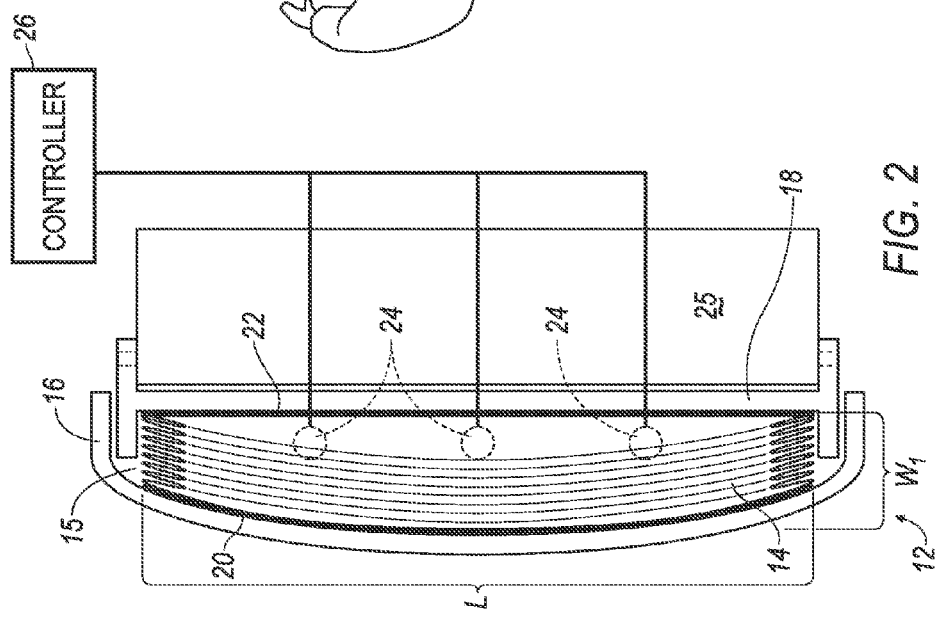
FIG. 3 is a top sectional view of an exemplary bumper bolster system with a bolster in an deployed state.
Figure 4:
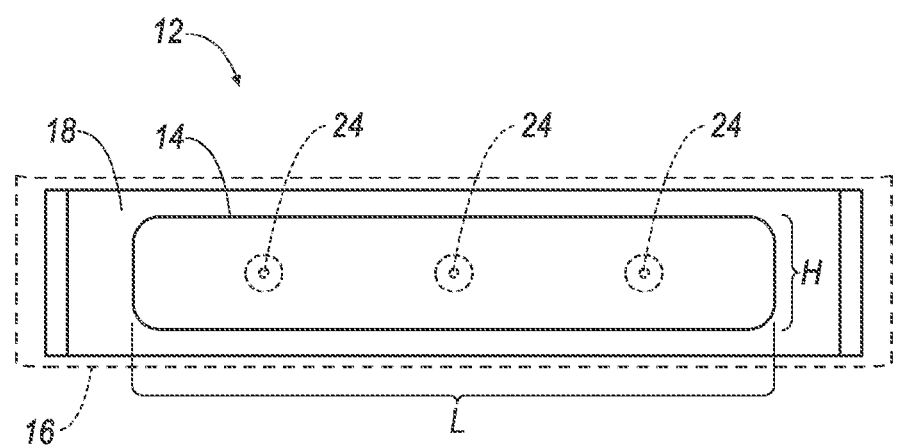
FIG. 4 is a front view of an exemplary bumper bolster system.

As illustrated in FIG. 1, a vehicle 10, e.g., an automobile, light truck, etc., may include a bumper bolster system 12. Turning to FIGS. 2-4, the system 12 includes an inflatable bolster 14 situated in an interior bumper space 15 between an outer bumper cover 16 and an inner bumper 18. The bolster 14 generally has a length L, and a height H, dimensioned for the bolster 14 to fit within a space between the bumpers 16, 18. Further, a width $W_1$ of the bolster 14 in an undeployed, folded position, as discussed below, is determined by a distance between the bumpers 16, 18 when the system 12 is in the undeployed state. A width $W_1$ of the bolster 14 in a deployed position, as also discussed below, is generally two to three times the width $W_1$.

The inner bumper 18 may be mounted to a vehicle 10 frame or bumper beam 25 in a known manner. The bolster 14 is generally affixed to the bumpers 16, 18 with respective welds 20, 22. For example, the bolster 14 is generally made of a plastic, e.g., polypropylene or the like, e.g., some other resinous material, which may be welded to the bumpers 16, 18 in a known manner. Use of plastic for the bolster 14 advantageously allows for benefits that cannot be achieved with other materials. In particular, plastic allows for the bolster 14 to be expandable, yet at the same time is sufficiently rigid to be foldable in an accordion-like fashion, and to be securely mounted in the interior bumper space 15, and to remain properly positioned to expand the space 15 upon inflation.

Further, such welds 20, 22 may be used to seal seams of the bolster 14, and/or seams of the bolster 14 may be sealed at other locations. Moreover, although a single weld 20 is shown attaching the bolster 14 to the bumper 16, the weld 20 need not be continuous along a side of the bumper 16, but multiple welds 20 could be provided. Likewise, multiple welds 22 could be provided affixing the bolster 14 to the inner bumper 18. In any case, it is important that the bolster 14 is hermetically sealed to allow for inflation of the bolster 14 by gas from inflators 24, and that the bolster 14 is securely affixed to each of the bumpers 16, 18. In general, a hermetic seal of the bolster 14 may be achieved by the weld 20 to the outer bumper 16, with the inner bumper 18 providing a reaction surface for the bolster 14. It is also possible that one of the welds 20, 22 could be omitted.

One or more inflators 24 is disposed within the bolster 14, the inflators being communicatively coupled with a controller 26, e.g., via wires, a wire harness, and/or a vehicle 10 communications bus, etc., wires or other communications mechanisms being sealed by the weld 22. Although the bolster 14 is not an airbag, and is made of plastic, as mentioned above, rather than cloth or material typically used for an airbag, inflators 24 may be airbag inflators or the like, i.e., mechanisms for providing an inflation gas to the bolster 14.

Further, controller 26 may be an airbag controller or the like such as is known for detecting a collision or imminent or likely collision, and providing a signal to the inflators 24 to provide the inflation gas. In any case, the controller 26 generally includes a processor and a memory, the memory storing instructions executable by the processor. Further, the controller 26 generally is in communication with various vehicle 10 systems, e.g., via a vehicle communications bus such as a controller area network (CAN) bus or the like. For example, as is known, various sensors such as cameras, radar, lidar, etc., may be used to provide information to the controller 26, from which the controller 26 determines that a pedestrian collision is imminent or occurring.

As seen in FIG. 2, the bolster 14 includes corrugated sides to accommodate folding in an accordion-like fashion in an undeployed state. As seen in FIG. 3, when the controller 26 detects a likely or actual collision with a pedestrian, the controller 26 triggers the inflators 24, thereby inflating the bolster 14, which expands, e.g., as permitted by the accordion folds. In one embodiment, inflation of the bolster 14 increases a distance between the bumpers 16, 18 by a factor in a range of about two to three, i.e., as mentioned above, the deployed width $W_2$ of the bolster 14 is, in an exemplary embodiment generally two to three times greater than the undeployed width $W_1$. However, other ratios of the widths $W_1$, $W_2$ could be used.

In any case, in the deployed state, the bolster system 12 is in a full energy-absorption position, and provides for a greater absorption of energy than in the undeployed state, the deployed state providing greater protection to a pedestrian. However, in the undeployed state, the bolster 14 advantageously allows the outer bumper 16 to be closer to the inner bumper 18, and for the front of the vehicle 10 to have a smaller profile, than is possible with systems using energy absorbing materials permanently mounted in a full energy-absorption position.

Because the outer bumper 16 moves away from the inner bumper 18 when the bolster 14 is inflated, the outer bumper 16 and the inner bumper 18 may not be attached to one another. However, if the bumpers 16, 18, are attached, such attachment must be easily detachable or breakable when the bolster 14 is inflated.

As used herein, the adverb "substantially" means that a shape, structure, measurement, quantity, time, etc. may deviate from an exact described geometry, distance, measurement, quantity, time, etc., because of imperfections in materials, machining, manufacturing, etc.

In the drawings, the same reference numbers indicate the same elements. Further, some or all of these elements could be changed. With regard to the components, processes, systems, methods, etc. described herein, it should be understood that these are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising:
    an outer bumper;
    an inner bumper, and
    a bolster disposed in a space between the outer and inner bumpers; and
    at least one inflator communicatively coupled to a controller and arranged to inflate the plastic bolster;
    wherein the bolster has corrugated sides, each corrugated side forming a plurality of folds that accommodate deployment of the bolster, each of the folds extending for substantially a length of the inner bumper.

2. The system of claim 1, wherein the folds allow the bolster to expand from an undeployed state to a deployed state.

3. The system of claim 1, wherein the bolster expands from a first width in an undeployed state to a second width in a deployed state such that the second width is in a range of two to three times greater than the first width.

4. The system of claim 1, wherein the at least one inflator is a plurality of inflators.

5. The system of claim 1, wherein the bolster includes at least one weld to affix the bolster to the outer bumper.

6. The system of claim 1, wherein the bolster includes at least one weld to affix the bolster to the inner bumper.

7. The system of claim 1, wherein the controller is programmed to trigger the at least one inflator upon detecting that a pedestrian collision is at least one of imminent and occurring.

8. The system of claim 1, wherein the system is mounted on a vehicle bumper beam.

9. The system of claim 8, further comprising a vehicle that includes the vehicle bumper beam.

10. A method, comprising:
    detecting that a pedestrian collision is at least one of imminent and occurring and providing a signal to trigger at least one inflator, the inflator being arranged to inflate a bolster disposed in a space between an outer bumper and an inner bumper wherein the bolster has corrugated sides, each corrugated side forming a plurality of folds that accommodate deployment of the bolster, each of the folds extending for substantially a length of the inner bumper.

11. The method of claim 10, wherein the folds allow the bolster to expand from an undeployed state to a deployed state.

12. The method of claim 10, wherein the bolster expands from a first width in an undeployed state to a second width in a deployed state such that the second width is in a range of two to three times greater than the first width.

13. The method of claim 10, wherein the at least one inflator is a plurality of inflators.

14. The method of claim 10, wherein the bolster includes at least one weld to affix the bolster to the outer bumper.

15. The method of claim 10, wherein the bolster includes at least one weld to affix the bolster to the inner bumper.

16. The method of claim 10, wherein the inner bumper is mounted on a vehicle bumper beam.

17. The method of claim 16, wherein the vehicle bumper beam is installed in a vehicle.

18. The system of claim 4, wherein each of the plurality of inflators is disposed within the plastic bolster.

19. The system of claim 2, wherein the accordion folds are of substantially a same length as one another.

20. The system of claim 19, wherein the accordion folds are substantially a length of the bolster.

* * * * *